United States Patent Office 2,752,376
Patented June 26, 1956

2,752,376

HYDROXYLATION OF VEGETABLE OILS AND PRODUCTS THEREOF

Percy L. Julian, Oak Park, Herbert T. Iveson, Elmhurst, and Sol B. Radlove, Chicago, Ill., assignors to The Glidden Company, Cleveland, Ohio, a corporation of Ohio No Drawing. Application April 19, 1952, Serial No. 283,248

16 Claims. (Cl. 260—405)

This invention relates to improvements in vegetable oils and more particularly it relates to hydroxylated vegetable oils of superior emulsifying and other surface active properties. Especially our invention provides new lactic acid and other esters of vegetable oils and methods for the preparation of such esters.

It is known that vegetable oils, such as soyabean oil, are essentially triglyceride esters of one or more unsaturated fatty acids. Such esters are essentially lipophilic in character. Due primarily to their ready availability and relatively low cost, many attempts have been made to utilize the vegetable oils in surface active compositions, either by admixing these lipophilic substances with hydrophilic adjuvants or by altering their structure by chemical reaction to improve the lipophilic/hydrophilic balance of the molecule. Thus many of the naturally-occuring oils have been sulfonated to improve their surface active character and thus to yield technically useful products. However, in many instances, especially when so treating oils containing dienoic or polyenoic acids, the resultant sulfonated compositions contain polymerized and/or oxidized constituents which have resulted in highly colored and/or gummy products albeit of improved surface active character. Such products are undesirable for many fields of application especially for food products. It is therefore desirable to produce new compositions from vegetable oils which possess improved surface active properties and which are acceptable for use in edible compositions.

It is known further to treat vegetable oils with peracids such as peracetic acid or with a mixture of hydrogen peroxide and a lower aliphatic acid such as formic or acetic acids in order to produce a hydroxylated material, i. e., one of improved hydrophilic character. According to one theory explaining the mechanism of such a reaction, the peracids, such as are formed by reaction of the peroxide and lower aliphatic acid, initially react with the ethnoid linkages of the fatty acid radicals of the glyceride portion of the vegetable oil, yielding epoxy compounds. These, upon further treatment, yield hydroxy esters. The latter, upon saponification, are converted into dihydroxy derivatives of the originally unsaturated fatty acid radical. These probable reactions are indicated by the following formulae:

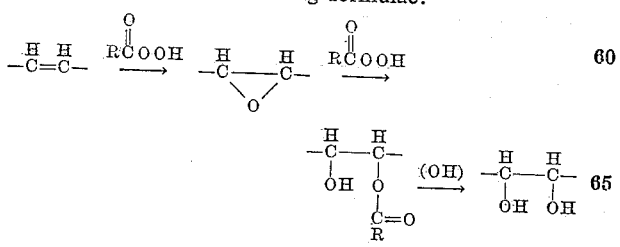

However, the severity of the saponification reaction required to hydrolyze the hydroxy ester also produces substantial saponification of the glyceride linkages of the vegetable oil. Inasmuch as for many purposes the glyceride structure is desirable, it can readily be seen that these prior art methods for the preparation of hydrophilic derivatives of vegetable oil constituents leave much to be desired.

Accordingly, it is an object of this invention to provide vegetable oil derivatives of improved surface active properties.

Another object of our invention is to modify the hydrophilic-lipophilic balance of vegetable oil constituents to improve the surface active properties thereof.

Still another object is to provide a process for forming lactic acid and other lower hydroxy acid esters of vegetable oil constituents.

It has been found that the above objects can be attained by treating vegetable oils in the presence of lactic acid or other lower hydroxy acid under conditions which bring about hydroxylation of the vegetable oil, while at the same time preserving the glyceride structure of the oil.

In the process of our invention, we have found that a vegetable oil, such as soya oil, when treated with a concentrated solution of hydrogen peroxide, e. g. 90% $H_2O_2$, and in the presence of lower hydroxy carboxylic acid (e. g. lactic acid) will react at temperatures above about 70° C. We have found further that it is unnecessary to saponify the resultant product. It is believed that the course of the reaction may be indicated by the following formulae:

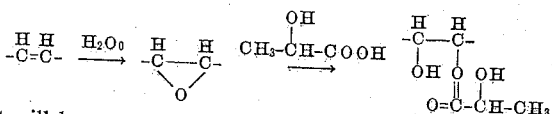

It will be seen that the products of our invention, therefore, contain two new hydroxyl groups and differ from the prior art products in that (1) the glyceride linkages are not destroyed, (2) the new products contain no toxic residues such as are derived from the use of formic acid, or highly odoriferous residues such as are obtainable from the use of acetic acid, and (3) two strongly hydrophilic residues are introduced into the molecule at the double bond without destruction of the glyceride structure, thereby improving the balance of hydrophilic-lipophilic groups. Each double bond originally present in the acids of the oil may be so modified if the hydroxylation is carried sufficiently far.

As an alternative procedure, it has been found that relatively dilute hydrogen peroxide can be used as a reagent when the excess water is fractionally distilled from the reaction mass gradually until the reactive concentration of peroxide (or peracid) is obtained. Thereafter by continuing the frationation the water formed in the reaction is removed. Because of the dangers inherent in handling concentrated solutions of hydrogen peroxide, especially on a commercial scale, this alternative procedure may in some instances be the preferred one.

This procedure is similar to that disclosed and claimed in co-pending application Serial No. 33,684, filed June 17, 1948, of Julian, Iveson and Liechti, now U. S. Patent No. 2,629,602. In that application a phosphatide possessing unsaturated fatty acid radicals is treated under hydroxylating conditions with a mixture of hydrogen peroxide and an edible water-soluble lower hydroxy carboxylic acid. We have found that the relatively mild conditions suitable for hydroxylating phosphatides are not sufficiently effective to materially alter the hydrophilic-lipophylic balance of vegetable oils. The concentration of peroxide should be above about 70% and the reaction temperature above about 70° C. for hydroxylation of vegetable oils, whereas phosphatides react with 100 volume (27.5%) $H_2O_2$ at temperatures in the order of about 40° C.

The new hydroxylated oils have a decreased iodine value, indicating a lesser degree of unsaturation and thus hydroxylation. It is possible to hydrolyze the product to determine the acetyl value of the fatty acids recovered. Inasmuch as these show a substantial increase in acetyl value over the fatty acids recovered from untreated oils, it is indicated, therefore, that hydroxylation occurs in the fatty acid portion of the treated oil. Dihydroxystearic acid has also been recovered from the hydrolysate of similarly treated material.

The following examples will illustrate the preferred modes of our invention:

Example I 129 g. of refined soya oil having an iodine value (I. V.) of 132.5, and 30 g. of 85% aqueous lactic acid were agitated and heated to between 90° and 100° C. Thereafter 48 g. of 90% hydrogen peroxide were added dropwise during three hours and the resultant mixture was heated for an additional two and a half hours thereafter. The mass was then distilled in vacuo until a dry residue was obtained. The product, a pale viscous oil, had an I. V. of 22.7 and an acid value of 19.5.

Example II

A mixture of 129 g. soya oil (I. V., 132.5), 30 g. 85% aqueous lactic acid and 24 g. 90% hydrogen peroxide was agitated and cautiously heated, under reflux. At about 65° C. a strongly exothermic reaction occurred and the temperature rose spontaneously to about 85° C. After the vigorous initial reaction had subsided, the mass was heated at 90° to 94° C. for a total of 5 hours and then cooled. The aqueous portion (27 g.) of the mixture which separated was removed and the oil layer was dried to a moisture content of less than 1% by heating in vacuo on a steam bath. The iodine value of the resultant product was 84.4 and its acid value was 11.2.

Example III

As indicated in Example II above, the reaction involving concentrated hydrogen peroxide is extremely exothermic and indeed can reach explosive proportions. In order to allay this hazard, the peroxide can either be added slowly (as in Example I) to avoid substantial excesses, or a more dilute concentration of peroxide can be used and the mixture fractionated to remove excess water and gradually approach the reactive concentration. Thereby the reaction occurs gradually and the hazards of vigorous reaction are avoided. The following example illustrates this alternative procedure:

454 g. of soya oil, 72 g. of 85% aqueous lactic acid and 136 g. of 27.5% hydrogen peroxide were agitated and heated in an apparatus which included a 12-in. glass fractionating column. The mixture was heated under a vacuum of 15" and maintained between 85° and 95° C. At the end of 8½ hours the distilland had become clear and light yellow in color. The product weighed 498 g. and its iodine value was 104, compared to 133, the iodine value of the original oil. The acid value of the product was 25.6.

Example IV

The novel hydroxylated lactic acid esters of vegetable oil are useful as components of highly effective emulsifying agents for food products. For example, in the art of cake baking it is known that the ratio of sugar to flour used in the batter largely determines the moisture retention, sweetness and tenderness of the product. Accordingly, a sugar/flour ratio as high as possible is desirable. However, as this ratio approaches or exceeds unity, the finished cake tends to become smaller in volume (i. e. is more prone to "fall") and is heavier in texture. This tendency of high sugar/flour ratio cakes to fall has been overcome in the past by the use of relatively large proportions of expensive emulsifiers, which are believed to supplement the ability of the flour to stabilize the emulsion of the shortening and water.

In the preparation of a cake having a sugar/flour ratio of 1.35/1, the use of 4% of the emulsifier Promofat (a product of Procter & Gamble, being a mixture of mono- and diglycerides) results in a cake volume of 1380 cc./pound.

A second cake analogously prepared in which 1½% of a mixture composed of 20% of the alcohol-insoluble moiety of vegetal lecithin dispersed in 80% hydroxylated soybean oil was used as the emulsifier instead of 4% Promofat. The resultant cake had a volume of 1385 cc./pound, which cake was equal to or superior to the first cake in moisture retention, tenderness, texture, flavor and general appearance. The hydroxylated soybean oil used in the emulsifier was prepared in the manner described in Example I.

A third cake was prepared using as emulsifier 2% of a mixture composed of 20% of the alcohol-soluble moiety of vegetal lecithin and 80% of Promofat. This cake had a volume of 1370 cc./pound.

Emulsifiers of the type used in the preparation of the second cake described above and particularly adapted for use in baked goods and high ratio cakes are described and claimed in the co-pending application of Julian, Iveson and Radlove, Serial No. 291,974, filed June 5, 1952. Reference is also made to the co-pending application of Julian and Iveson, Serial No. 232,868, filed June 21, 1951, wherein compositions comprising the alcohol-soluble fraction of vegetal lecithin are described and claimed.

Example V 500 g. soya oil (I. V., 132.5) and 25 ml. of water were heated and then maintained between 100° and 110° C. A stream of air was blown through the mixture for 72 hours. The iodine value of the blown oil was lowered to 104.3. Its acid number was 3.0. The index of refraction of the oil increased from $N_{25}=1.4720$ to $N_{25}=1.4747$. The viscosity measured on the Gardner-Holdt scale increased from A— to F.

129 g. of the air-blown oil and 30 g. of 85% aqueous lactic acid were heated to about 85° C. 38.4 g. of 90% hydrogen peroxide was added dropwise to the mass maintained between 90° and 100° C. during about 2 hours. Thereafter the mixture was heated at 85° C. for 2 hours and the almost colorless viscous oil was cooled and transferred to a separatory funnel. The mixture was permitted to stratify for about 16 hours, and the emulsion layer was separated and centrifuged. The oil was dried in vacuo on a steam bath. 152.5 g. of oil having an iodine value of 12.5 and an acid number of 57.3 were obtained.

This oil was neutralized by mixing with a solution of 13 g. of sodium bicarbonate in 20 ml. of water. The water was then removed in vacuo on a steam bath.

The following test indicates the efficiency of this hydroxylated oil as an emulsifier:

1.5 g. of the neutralized hydroxylated oil was dissolved in 5 g. of soya oil, and 5 ml. of water was shaken with this solution for 1 minute.

On standing—

| | |
|---|---|
| 7 minutes | 1 ml. of H₂O separated. |
| 16 minutes | 1.5 ml. of H₂O separated. |
| 27 minutes | 2.0 ml. of H₂O separated. |
| 1½ hrs | 3.0 ml. of H₂O separated. |

Example VI 129 g. of blown soya oil and 12.5 g. of tartaric acid were heated to 81° C. and 30 g. of 90% hydrogen peroxide was added. An exothermic reaction occurred almost immediately. The mixture was maintained at about 85° C. for 1 hour and 40 minutes. The rather viscous mass was diluted with about 250 ml. of water and the mixture, after being well shaken, was permitted to stratify for about 16 hours. The lower oil layer was separated and dried by heating in vacuo on a steam bath. 112.5 g. of crude oil, being rather viscous and contaminated with gelled particles, had an I. V. of 18.0 and an acid number of 16.5.

A similar experiment in which a mixture of 5 g. of 85% lactic acid with 8 g. of tartaric acid was used in place of the tartaric acid in the above experiment gave an oil having an iodine value of 17.5 and an acid number of 23.8.

*Example VII*

500 g. of cottonseed oil was heated to between 100° and 110° C., and was then blown with air for 11 hours. The iodine value of the oil was reduced from 109.0 to 94.5.

258 g. of the blown cottonseed oil and 57.4 g. of 85% lactic acid were heated to 78° C. and 62.3 g. of 90% $H_2O_2$ was added. An exothermic reaction occurred which lasted for 2½ hours. Thereafter the mixture was heated at between 85° and 90° C. for 1 hour. The mass was cooled and transferred to a separatory funnel wherein the oil was washed with two 40 ml. portions of water. The washed oil was dried in vacuo on a steam bath. 282.5 g. of the oil having an iodine value of 25.6 and an acid number of 13.1 was obtained.

A similar run using 70 g. of 85% lactic acid and 76 g. of 90% $H_2O_2$ in which the mixture of oil and lactic acid, after being heated to 85° C., was cooled to 50° C. before addition of the peroxide, resulted in a product having an iodine value of 11.7 and an acid number of 14.8.

*Example VIII*

Linseed oil (I. V., 177.2) was blown with air at 200° C. for 1 hour to an iodine value of 152.2.

258 g. of the blown oil and 87.5 g. of 85% lactic acid were heated to about 80° C. 95 g. of 90% $H_2O_2$ were added and the ensuing exothermic reaction raised the temperature to 97° C. After 3 hours, the evolution of heat from the reaction subsided and the mass was heated at 85° C. for 2 hours thereafter. The reaction mixture was cooled, dissolved in ether and the solution was washed 4 times with water. After removal of the solvent, a residue of pale yellow oil weighing 310 g. and having an iodine value of 19.0 was obtained.

This product proved satisfactory as a component of an emulsifier in cake baking tests as described in Example IV above.

Based on results obtained in the course of our work, we prefer to prepare our new products in such manner as to bring them to iodine values between 15 and 30. Such products are suitably active as emulsifying agents, either per se, or in admixture with other surface active agents, and are comparatively easily prepared. We have found that as the iodine value decreases below about 15, the consumption of hydrogen peroxide increases disproportionately. This is due in part to the fact that at the relatively high temperature of the reaction, the rate of decomposition of the concentrated peroxide increases. This greater consumption of peroxide may be explained also by the obvious fact that as the reaction proceeds to completion, the rate of reaction decreases, while at the same time side reactions, decomposition, further oxidation, etc. increase.

Although the degree of unsaturation of vegetable oils may vary from specie to specie and may even vary with changes in source and variety within a single specie, it is possible to establish a generalization governing the amount of peroxide required to effect a specific lowering of iodine value. From our results based on a large number of experiments involving many varieties of vegetable oils, it has become possible for us to estimate that about 1 gram molecular weight (34 g.) of 100% $H_2O_2$ will be required to reduce the iodine value of 100 grams of oil 100 units. This amount is, of course, an approximation and will vary somewhat not only with the type of oil used but also with the amount of decomposition occurring in the reaction.

The proportion of lactic acid used should theoretically be equivalent to one-half of the hydroxyl groups introduced. Since two hydroxyl groups are introduced at each original double bond which is first epoxidized and then opened up for esterification with an hydroxy acid (e. g. lactic), and since the hydroxy acid accounts for one of those hydroxyls, it will be clear that one mol of hydroxy acid is theoretically required for every two hydroxyls introduced. When considered in relation to reduction in iodine value (as a measure of the number of double bonds which have been epoxidized), it will be clear that when the reduction in iodine value is converted to the corresponding number of mols of iodine, then each mol of iodine is equivalent to one original double bond which has been epoxidized, and one mol of hydroxy acid is then theoretically required for each molar unit of reduction in iodine value. Thus, in the instance of 100 grams of soybean oil, where a reduction in iodine value from 132.5 to 20 is desired, such reduction will be equivalent (by definition of "iodine value") to a total of 112.5 g. iodine per 100 grams of oil. On a molar basis, such reduction is equivalent to $$\frac{112.5}{253.8} = 0.444$$

mol iodine/100 g. oil. This amount of iodine is, in turn, equivalent to 0.444×90 (mol wt. of lactic acid)=39.96 grams lactic acid/100 g. of oil.

The latter amount of lactic acid is theoretically required to introduce two hydroxyl groups at each original double bond which has been epoxidized, in an oil which by our treatment has had its iodine value reduced from 132.5 to 20. In actual practice, we have found as little as about 50% of this calculated theoretical amount can be used effectively; that is, that as few as half of the epoxide groups may be opened up to form hydroxy acid ester groupings illustrated hereinabove by formulae. Preferably, however, an excess over the theoretical quantity is used and we especially prefer an excess of about 10%. Thus, as little as .25 mol of hydroxy acid can be used per hydroxyl group introduced in the oil, while as much as .50 mol + 10% or .55 mol can be used.

The amount of unreacted lactic acid remaining in the product can be estimated from the acid number of the product. For many uses, the presence of substantial amounts of free acid in the product is to be avoided. Accordingly, it is sometimes desirable, especially in those instances where the product has a high acid number (i. e. above 25) to reduce this value. This can be done either by washing the product with water or by neutralization with an alkaline material, such as sodium bicarbonate, potassium hydroxide and the like. Alcohols such as methanol, ethanol, etc., can also be used to reduce the acid number.

This invention has been described and illustrated with reference to specific embodiments thereof. While these examples include our preferred procedures, it should be noted that many variations of these procedures are possible. Thus, in place of the lactic and tartaric acids we have disclosed above, any lower hydroxy carboxylic acid can be used, for example, citric, hydroxybutyric, etc. When edible emulsifiers are to be prepared, the edible lower hydroxy carboxylic acids are preferable. Other vegetable oils than those disclosed can be improved in the manner of our invention. In general, we can treat any oil containing a significant proportion of glyceride esters of unsaturated fatty acids, such as peanut, corn, safflower, sunflower and like oils. The drying and semidrying oils are preferred for the preparation of edible emulsifiers.

As indicated, the oils may be blown prior to treatment in accordance with the process of our invention. Blowing, as is well known, acts to reduce the unsaturation of the oils probably by formation of oxygen-containing ring compounds. It is believed that these compounds are similar to those which are formed initially by the peroxide.

Therefore, the use of blown oils results in a reduction in the amount of the relatively expensive hydrogen peroxide required to effect a comparable degree of hydroxylation. We have found that it is possible to obtain a greater degree of hydroxylation (i. e. greater reduction of iodine value) by the use of blown oil, even with a lesser quantity of hydrogen peroxide than would otherwise be required.

A significant improvement in hydrophilic/lipophilic balance is secured by a reduction in iodine value of at least 20 units. The products of our invention which have had their iodine value reduced at least about 75 units to an iodine value below about 30 possess an especially improved balance of hydrophilic and lipophilic properties and therefore are improved surface active agents. They can be used alone as emulsifiers to form oil-in-water type emulsions, and in conjunction with other surface active agents to provide compositions suitable for specific uses. Further, these new products are useful as intermediates in the preparation of other surface active agents. For example, the sulfuric acid esters of these hydroxylated oils (which can be prepared by treatment of the hydroxylated oils with sulfuric acid or chlorosulfonic acid) are of value as wetting agents.

In this specification we have, for the purposes of clarification, resorted to certain theoretical explanations, but it should be distinctly understood that we are not bound by the ultimate correctness of these theories.

Having described our invention, what we claim is:

1. The process which comprises the steps of: treating glyceride ester material selected from the group consisting of glyceride oil having unsaturation in at least one fatty acid radical thereof, unsaturated blown glyceride oil and mixtures thereof, at temperatures between about 70° C. and reflux temperatures with an aqueous treating agent composed essentially of hydrogen peroxide having a concentration of at least about 70% and at least one water-soluble lower hydroxy carboxylic acid, until the iodine value of the treated material has been reduced at least about 20 units but has not been reduced below a value of about 15; thereafter recovering the treated material and drying it; the amount of hydroxy carboxylic acid in said aqueous treating agent being between about 0.25 and 0.55 mol per hydroxyl group introduced into the treated material.

2. The process as claimed in claim 1 wherein the hydrogen peroxide having a concentration of at least about 70% is prepared in situ from an aqueous hydrogen peroxide solution of a concentration below about 70% by distilling water out of said aqueous solution while the said solution is in contact with the glyceride ester material to be treated and with the hydroxy carboxylic acid until the hydrogen peroxide attains a concentration in water of at least about 70%.

3. The process as claimed in claim 1 wherein the iodine value of the treated material has been reduced at least 20 units to a value between about 15 and 30.

4. The process as claimed in claim 3 wherein the glyceride material is soya oil, and wherein the lower hydroxy carboxylic acid is edible acid.

5. The process as claimed in claim 4 wherein the edible acid is lactic acid.

6. The process as claimed in claim 4 wherein the edible acid is tartaric acid.

7. The process as claimed in claim 4 wherein the edible acid is a mixture of lactic and tartaric acids.

8. The process as claimed in claim 4 where the glyceride ester material is blown soya oil; and wherein the lower hydroxy carboxylic acid consists of edible acid.

9. The process as claimed in claim 8 wherein the edible acid is lactic acid.

10. The process as claimed in claim 8 wherein the edible acid is tartaric acid.

11. The process as claimed in claim 8 wherein the edible acid is a mixture of lactic and tartaric acids.

12. The process as claimed in claim 2 wherein the lower hydroxy carboxylic acid consists of edible acid.

13. The process as claimed in claim 12 wherein the glyceride ester material is soya oil.

14. Hydroxylated glyceride ester material containing fatty acid radicals and lower hydroxy monocarboxylic acid radicals, said hydroxylated material having been prepared by the process of claim 1.

15. Hydroxylated glyceride ester material containing fatty acid radicals and lower hydroxy monocarboxylic acid radicals, said hydroxylated material having been prepared by the process of claim 3.

16. Hydroxylated glyceride ester material as claimed in claim 15 and having an acid value below about 25.

References Cited in the file of this patent

UNITED STATES PATENTS

| | | |
|---|---|---|
| 2,073,011 | Hubbuch | Mar. 9, 1937 |
| 2,375,606 | Wirtel | May 8, 1945 |
| 2,406,206 | De Groote et al. | Aug. 20, 1946 |
| 2,416,485 | Lasher | Feb. 25, 1947 |
| 2,470,808 | De Groote et al. | May 24, 1949 |